United States Patent
Worek

(10) Patent No.: US 9,318,945 B2
(45) Date of Patent: Apr. 19, 2016

(54) RESONANT-MODE POWER SUPPLY WITH A MULTI-WINDING INDUCTOR

(75) Inventor: Cezary Worek, Cracow (PL)

(73) Assignee: AKADEMIA GORNICZO-HUTNICZA IM. STANISLAWA STASZICA W KRAKOWIE, Cracow (PL)

( * ) Notice: Subject to any disclaimer, the term of this patent is extended or adjusted under 35 U.S.C. 154(b) by 264 days.

(21) Appl. No.: 14/123,783

(22) PCT Filed: Jul. 23, 2012

(86) PCT No.: PCT/EP2012/064401
§ 371 (c)(1),
(2), (4) Date: Dec. 4, 2013

(87) PCT Pub. No.: WO2013/017456
PCT Pub. Date: Feb. 7, 2013

(65) Prior Publication Data
US 2014/0133189 A1    May 15, 2014

(30) Foreign Application Priority Data
Aug. 2, 2011   (PL) .......................................... 395846

(51) Int. Cl.
H02M 3/335   (2006.01)
H02M 1/32    (2007.01)
H02M 7/48    (2007.01)
(Continued)

(52) U.S. Cl.
CPC ................ *H02M 1/32* (2013.01); *H02M 3/335* (2013.01); *H02M 3/33507* (2013.01); *H02M 3/33523* (2013.01); *H02M 7/523* (2013.01); *H02M 2001/0058* (2013.01); *H02M 2007/4815* (2013.01); *Y02B 70/1433* (2013.01)

(58) Field of Classification Search
CPC ............. H02M 2001/0058; H02M 2007/4815; H02M 7/523; H02M 3/33523
See application file for complete search history.

(56) References Cited

U.S. PATENT DOCUMENTS

| 5,388,040 | A  |   | 2/1995  | Hall        |             |
| 6,151,231 | A  | * | 11/2000 | Saint-Pierre | H02M 3/33569 |
|           |    |   |         |             | 363/17      |
| 2003/0231514 | A1 | * | 12/2003 | Croulard    | H02M 3/3376 |
|           |    |   |         |             | 363/13      |

(Continued)

FOREIGN PATENT DOCUMENTS

| PL | 313150     | 9/1997  |
| PL | 339678     | 10/2001 |
| WO | 2009154489 | 12/2009 |

*Primary Examiner* — Emily P Pham
(74) *Attorney, Agent, or Firm* — Mark M. Friedman

(57) ABSTRACT

A resonant-mode power supply, comprising an assembly of switches connected in a bridge or a half-bridge configuration, a series resonant circuit connected in the bridge or half bridge diagonal, a part of which is formed by a multi-winding inductor by means of which a load is connected, and a controller configured to stabilize output voltages or currents by controlling the switching frequency of the assembly of switches. The series resonant circuit comprises an energy recirculation circuit (ERC1) for limiting the resonant circuit quality factor, connected through the diode rectifier (DR2) to the supply voltage node and a current monitoring circuit (CMC) configured to monitor the recirculation circuit current (Ilim) and, by means of the controller (C), to change the switching frequency of the assembly of switches (K1, K2, K3, K4) in order to reduce power supplied to the resonant circuit upon exceeding the threshold value by the current (Ilim) in the energy recirculation circuit (ERC1).

10 Claims, 6 Drawing Sheets

(51) Int. Cl.
*H02M 1/00* (2007.01)
*H02M 7/523* (2006.01)

(56) References Cited

U.S. PATENT DOCUMENTS

| | | | |
|---|---|---|---|
| 2006/0077695 A1* | 4/2006 | Garcea | H02M 3/3376 363/17 |
| 2006/0227577 A1 | 10/2006 | Horiuchi et al. | |
| 2006/0290295 A1* | 12/2006 | Yang | H05B 6/04 315/274 |
| 2009/0034298 A1* | 2/2009 | Liu | H02M 3/3376 363/17 |
| 2010/0020569 A1* | 1/2010 | Melanson | H01F 3/10 363/21.03 |

* cited by examiner

RESONANT-MODE POWER SUPPLY WITH A MULTI-WINDING INDUCTOR

TECHNICAL FIELD

The present invention relates to a resonant-mode power supply with a multi-winding inductor intended for direct-current voltages transformation.

BACKGROUND ART

The known resonant-mode power supplies contain switches, usually in the bridge or half-bridge configuration composed of controllable semiconductor devices, most often transistors, supplied from a voltage-source power supply, in the bridge or half-bridge diagonal whereof is connected a resonant circuit with a load connected by means of an output transformer.

In the Polish patent application P-313150 there is described a resonant-mode power supply which maintains a constant quality factor of the resonant circuit independently from the load. The resonant-mode power supply incorporates a quality-factor limiter composed of a transformer whereof the primary winding is connected in parallel with the resonant circuit capacitor whereas the secondary winding of said transformer is connected to the power supply source to allow feeding the excess energy from said capacitor back to the source. The distinctive feature of this resonant-mode power supply is the capability of correct operation with both shorted and open output circuit.

In the Polish patent application P-339678, a capacitive voltage divider with the equivalent capacity equal to the required resonant circuit capacity is employed instead of a transformer. By means of connecting a diode limiter between the current switches power supply bus and the common node of the capacitive voltage divider capacitors the voltage amplitude at this point was limited, thus energy recirculation and limitation of the series resonant circuit quality factor were achieved.

A technical drawback of the power supplies with energy recirculation according to patent specifications P-313150 and P-339678 is that in both of them where the load decreases, i.e. the load resistance increases, also the series circuit current decreases and its waveform become differ from the desired sinusoidal shape. Another major technical drawback of the solution described in the patent application P-313150 is that the energy recirculation circuit necessitates the use of a transformer of nearly the same power as that of the output transformer. The solutions described in the state-of-the-art literature utilize an additional winding of the output transformer connected through a rectifier to the power supply source in order to stabilize the output voltage or limit said output voltage where the output circuit becomes open.

From the US patent application US 2006/0227577 there is known a resonant converter intended for operation with an inverter. The converter enables transformation of fluctuating and relatively low voltages, obtained from renewable energy sources, to the level required by power grid. The converter comprises a parallel resonant circuit to which direct-current power is input from a low-voltage direct-current power supply by means of switching elements. DC-AC conversion is performed by means of zero-voltage switching. The high-frequency transformer whose primary side is connected to the parallel resonant circuit provides electrical isolation and generation of high voltage. The secondary side of the transformer is connected with a rectifier trough a series resonant circuit. The converter provides output voltage of 450V with output voltage changes of about 25-30%. The described converter structure is sensitive to rapid load changes. If at maximum output power a sudden disconnection of load occurs the energy stored in the resonant circuit, which generally is much larger than energy transmitted to the load during a single commutation cycle, may produce currents in the commutation circuit exceeding permissible values.

The aim of the invention is to develop a resonant-mode power supply for transformation of direct-current voltages, characterized by sinusoidal currents in the resonant circuit independently of the load and by high immunity to rapid changes in the output power.

DISCLOSURE OF THE INVENTION

The object of the invention is a resonant-mode power supply, comprising an assembly of switches connected in a bridge or a half-bridge configuration, a series resonant circuit connected in the bridge or half bridge diagonal, a part of which is formed by a multi-winding inductor by means of which a load is connected, and a controller configured to stabilize output voltages or currents by controlling the switching frequency of the assembly of switches. The series resonant circuit comprises an energy recirculation circuit for limiting the resonant circuit quality factor, connected through the diode rectifier to the supply voltage node and a current monitoring circuit configured to monitor the recirculation circuit current and, by means of the controller, to change the switching frequency of the assembly of switches in order to reduce power supplied to the resonant circuit upon exceeding the threshold value by the current in the energy recirculation circuit.

Preferably, the multi-winding inductor leakage inductance constitutes from 20% to 80% of the series resonant circuit inductance.

Preferably, the current monitoring circuit is configured to effect by means of the controller a change in the switching frequency of the assembly of switches even during a single period of the resonant circuit oscillations.

Preferably, the current monitoring circuit is configured to effect by means of the controller an increase in the switching frequency of the assembly of switches.

Preferably, the current monitoring circuit is adapted to turn-off the assembly of switches by means of the controller.

Preferably, the energy recirculation circuit is connected in parallel with the resonant circuit capacitor.

Preferably, inductive elements of the main resonant circuit have the form of the integrated inductor.

Preferably, the energy recirculation circuit is connected to the inductive element of the resonant circuit by strong magnetic coupling by means of the multi-winding inductor.

Preferably, inductive elements of the main resonant circuit have the form of the integrated inductor.

Preferably, to each of the switches there are connected in parallel capacitors, respectively.

BRIEF DESCRIPTION OF DRAWINGS

The invention will be shown by means of exemplary embodiments on a drawing in which.

MODES FOR CARRYING OUT THE INVENTION

Figure 1:
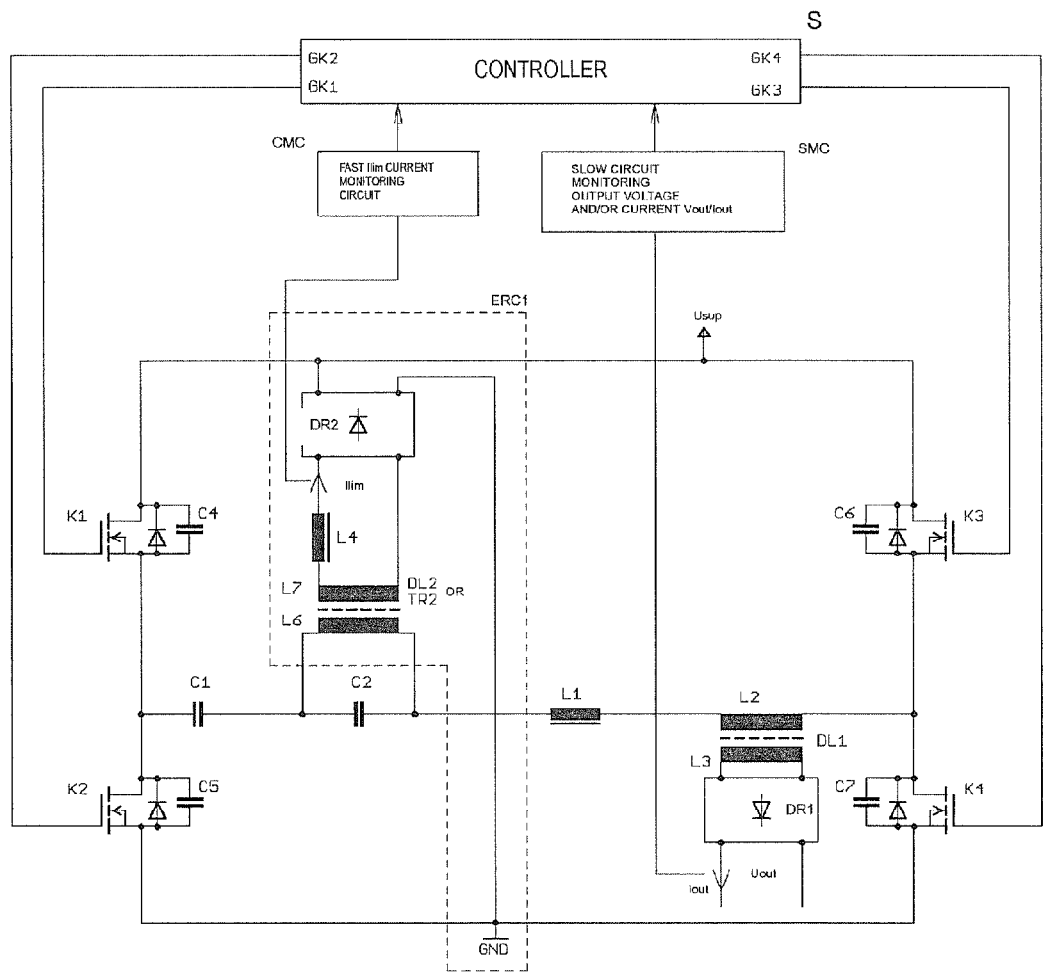
FIG. 1 shows the first exemplary embodiment of the resonant-mode power supply as a full-bridge resonant converter with a multi-winding inductor and with a quality-factor limiter incorporating a split resonance capacitance.

The first exemplary embodiment of the resonant-mode power supply as a full-bridge resonant converter with the multi-winding inductor and with the quality-factor limiter incorporating the split resonance capacitance is shown in FIG. 1. The resonant-mode power supply comprises an assembly of current switches K1, K2, K3, K4 connected in a bridge configuration. In the bridge diagonal is connected the series resonant circuit whereof part is the multi-winding inductor DL1, by means of which a load is connected to said resonant-mode power supply. The resonant-mode power supply comprises also a controller C that stabilizes output voltages or currents by controlling switching frequency of the switches assembly K1, K2, K3, K4 in response to indications of the output voltage and/or current monitoring circuit SMC. The series resonant circuit comprises the energy recirculation circuit ERC1 limiting the resonant circuit quality factor, connected through the diode rectifier DR2 to the supply voltage Usup. The ERC1 circuit provides protection of the resonant-mode power supply structure against overvoltages and overcurrents because in transient states it feeds the excess energy stored in the resonant circuit back to the supply source. The resonant-mode power supply furthermore comprises the current monitoring circuit CMC adapted to monitor the recirculation circuit current Ilim in the resonant circuit energy recirculation circuit ERC1 and, by means of the controller C, in order to effect a change in the switching frequency of the switches assembly K1, K2, K3, K4 so as to reduce power supplied to the resonant circuit upon exceeding the threshold value by the current Ilim in the energy recirculation circuit ERC1. Preferably the current monitoring circuit CMC operates quickly and responds even during a single cycle of the resonant circuit self-oscillations. A change in the switches assembly K1, K2, K3, K4 switching frequency may consist in either increasing the switching frequency or in stealing a certain number of cycles of the resonant circuit self-oscillations, i.e. turning the switches assembly off so as to limit overvoltages and overcurrents occurring in the circuit.

The resonant-mode power supply control system is therefore provided with at least two feedback loops. The first loop, which is the output voltage and/or current monitoring circuit SMC, stabilizes the output voltage, or current, or the output power, is a slow-response loop and its cut-off frequency is low, for example several hundred hertz. The second loop is a fast-response loop, which is the current monitoring circuit CMC in the energy recirculation circuit ERC1, which upon exceeding a specified threshold value by the current Ilim influences the switches assembly control so as to quickly reduce the power supplied to the resonant circuit.

The output transformer is preferably made as a multi-winding inductor the magnetic circuit whereof contains an air gap and the primary winding leakage inductance is a substantial portion of the series resonant circuit equivalent inductance whereas the magnetic coupling coefficient k takes values less than 0.98. The multi-winding inductor DL1 also provides the inverter isolation from the output circuit while energy is transferred from the inverter to load with very high efficiency, of about 96%. Such connection of load allows maintaining the resonant circuit current at the required level, even under no-load conditions, and therefore enables to improve dynamic response to rapid load changes.

In the first example embodiment the main resonance capacitance is split into two series connected capacitors C1 and C2, while the energy recirculation circuit ERC1 is connected in parallel to capacitor C2.

Preferably, to each of the switches K1, K2, K3, K4 are connected in parallel capacitors C4, C5, C6, C7, respectively that means the system operates in class DE.

The components values are chosen in such a manner that the current continuity in the series resonant circuit is maintained independently from the load and thereby dynamic performance of the resonant-mode power supply is substantially improved. Example parameters of the embodiment of the resonant-mode power supply shown in FIG. 1 are as follows: output power=5 kW, supply voltage Usup=420V, output voltage Uout=28VDC, C1=C2=110 nF, C4=C5=C6=C7=1 nF, L1=50 uH, L4=10 uH, L6=L7=800 uH with coupling coefficient between them k=0.99, L2=300 uH, L3=1.8 uH with coupling coefficient between them k=0.95.

Figure 5:
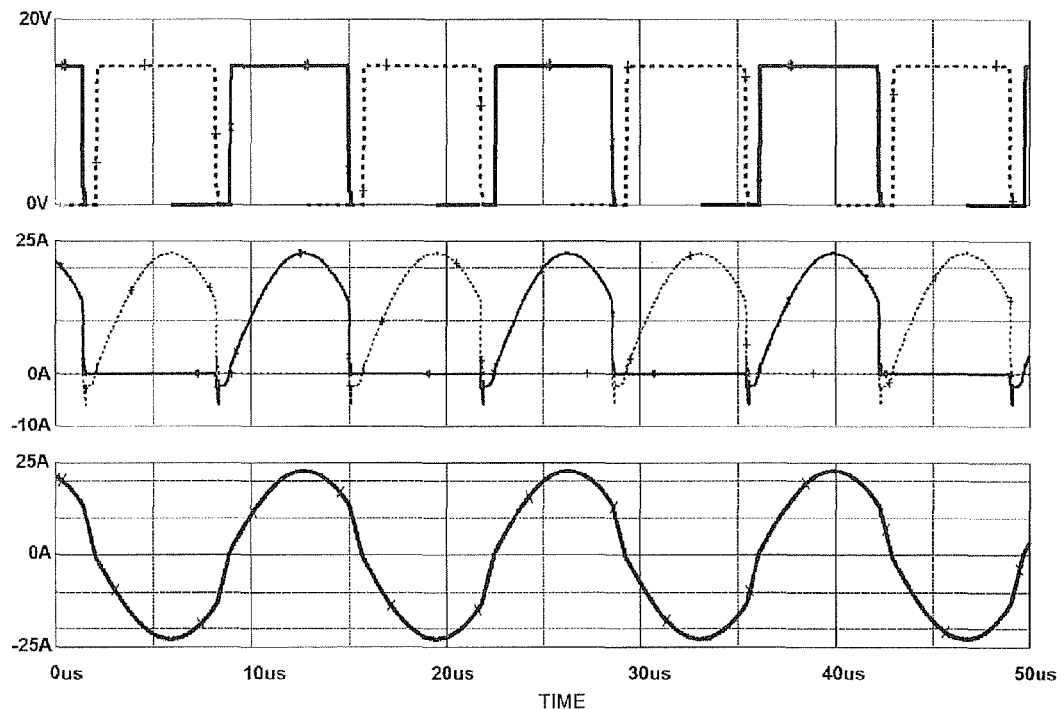
FIG. 5 shows waveforms of current and voltage in the first embodiment of the resonant-mode power supply at full load and nominal output voltage and current.
Figure 6:
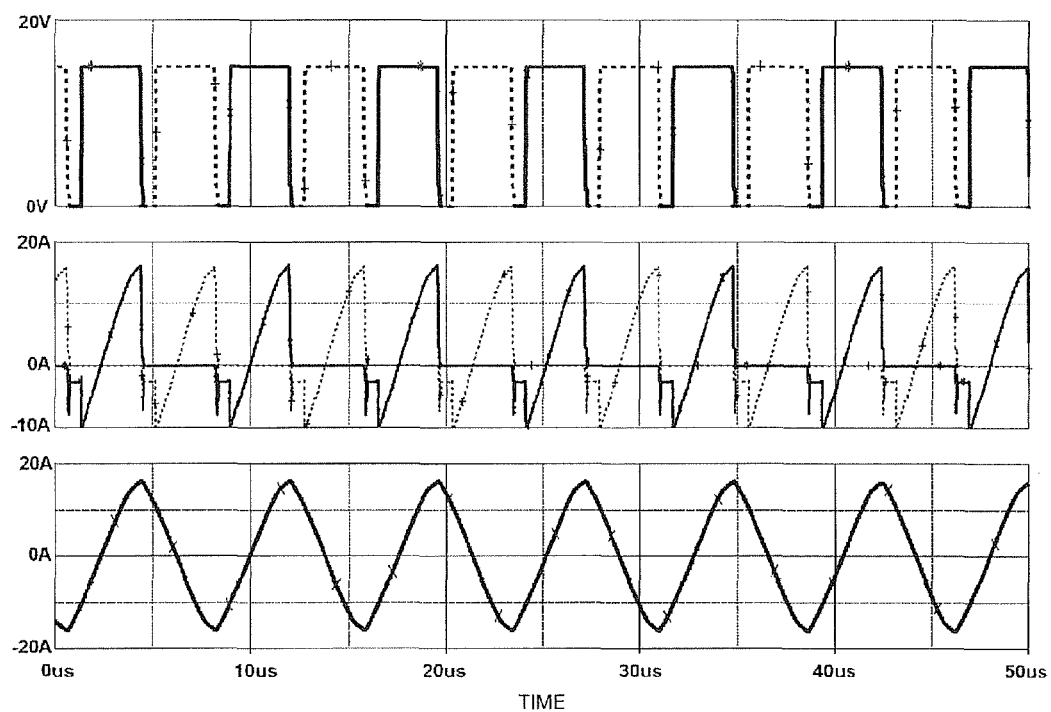
FIG. 6 shows waveforms of current and voltage in the first embodiment of the resonant-mode power supply with shorted output and nominal output current.
Figure 7:
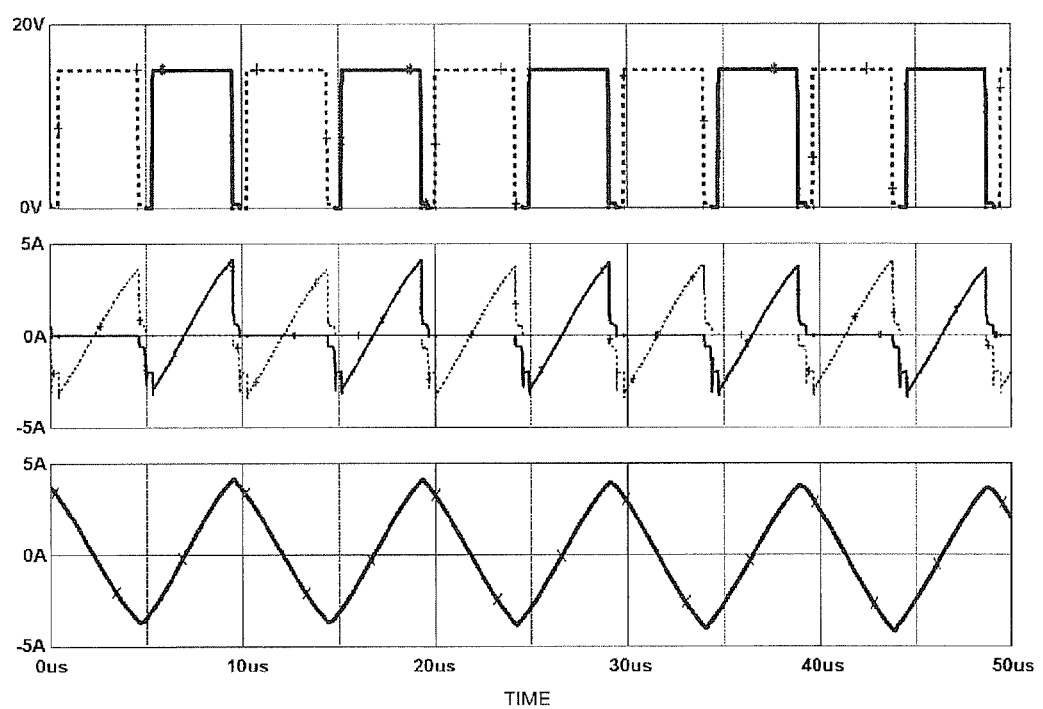
FIG. 7 shows waveforms of current and voltage in the first embodiment of the resonant-mode power supply loaded with 2% of the nominal load at nominal output voltage.

Example current and voltage waveforms in the first embodiment of the resonant-mode power supply at full load and nominal output voltage and current are shown in FIG. 5, whereas FIG. 6 shows waveforms for shorted output and nominal output current, and FIG. 7 shows waveforms at 2% of the nominal load and nominal output voltage. As follows from figure the current flow in the resonant circuit main inductor L1 is maintained even in the worst case, thus the structure according to the present invention is characterized by very fast time response to load changes. The upper plot represents the gate drive voltage of the low-side transistor K2 shown in dashed line, and the gate drive voltage of the high-side transistor K1 shown in solid line. The second plot from top represents the low-side transistor K2 drain current shown in dashed line and the high-side transistor K1 drain current shown in solid line. The bottom plot shows the current in the inductor L1. In order to protect the system against overcurrents and overvoltages that may occur in the resonant energy-conversion system, the threshold value of the recirculation circuit ERC1 current Ilim is set to 5 A.

Figure 2:
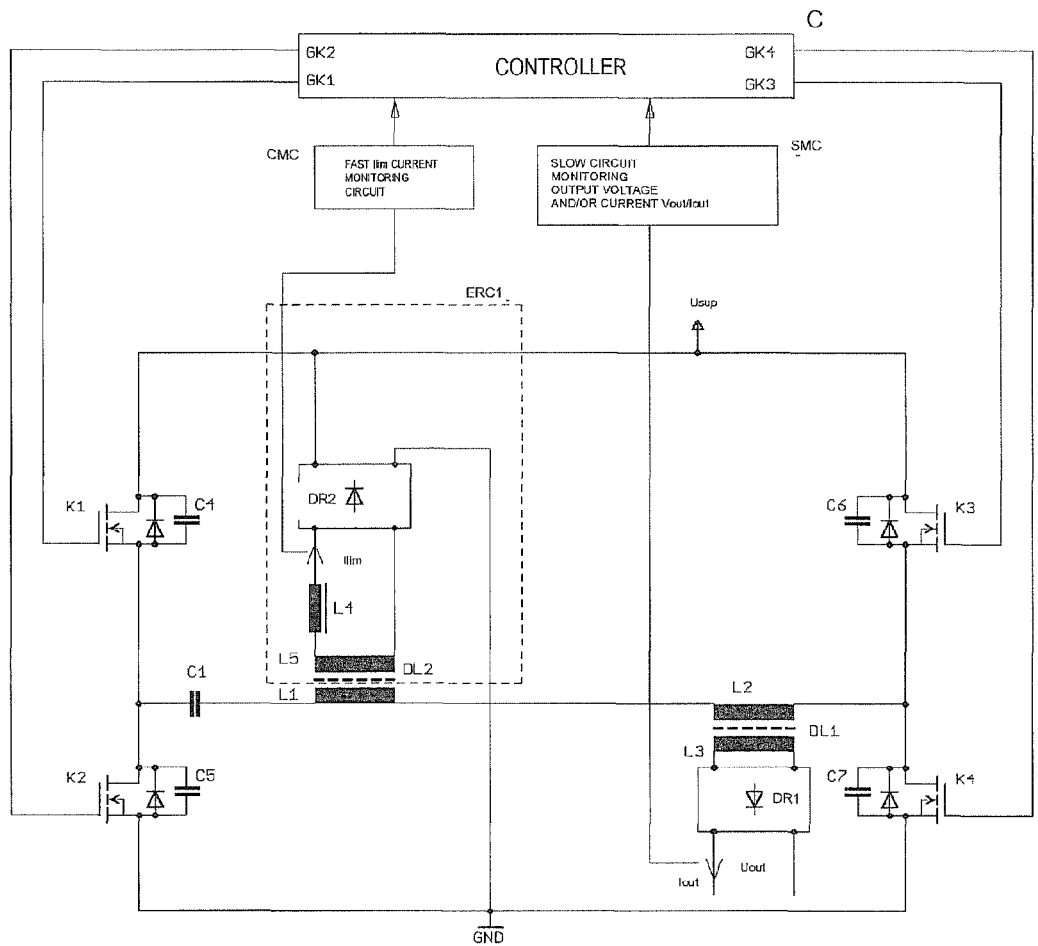
FIG. 2 shows the second exemplary embodiment of the resonant-mode power supply as a full-bridge resonant converter with a multi-winding inductor and with a quality-factor limiter incorporating the multi-winding inductor.

The second example embodiment of the resonant-mode power supply is shown in FIG. 2. It is similar to the first example embodiment except the quality-factor limiter ERC1 utilizes the multi-winding inductor DL2, the magnetic circuit whereof contains an air gap and the secondary winding is isolated from the primary by means of an inductor and diode rectifier. The advantage of this embodiment over the one shown in FIG. 1 is a smaller number of inductive elements because the quality-factor limiter ERC1 utilizes the main inductor L1 of the resonant circuit on which an additional winding of inductor L5 is wound and windings of both inductors are strongly coupled.

Figure 3:
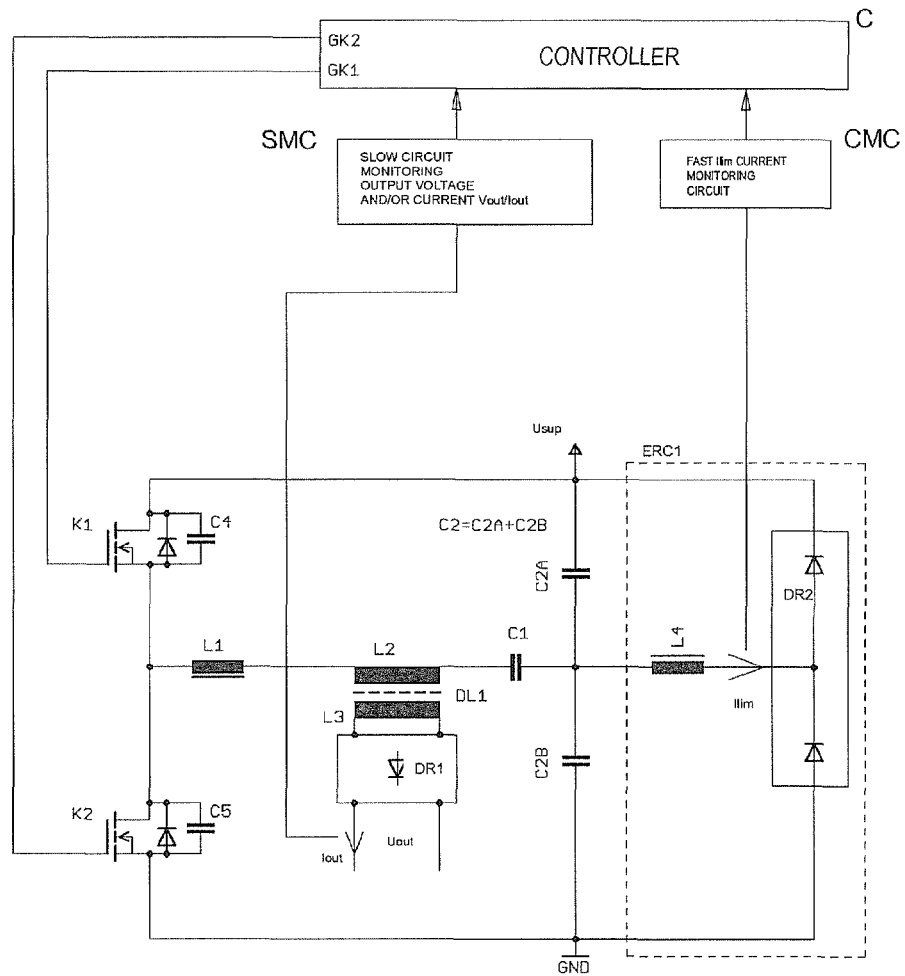
FIG. 3 shows the third exemplary embodiment of the resonant-mode power supply as a half-bridge resonant converter with a multi-winding inductor and with the quality-factor limiter incorporating a split resonance capacitance.

The third example embodiment of the resonant-mode power supply as a half-bridge resonant converter with the multi-winding inductor and with the quality-factor limiter incorporating the resonance split capacitance is shown in FIG. 3. The resonant-mode power supply comprises an assembly of current switches K1, K2 connected in a half-bridge configuration. In the half-bridge diagonal is connected a series resonant circuit whereof part is the multi-winding inductor DL1, by means of which a load is connected to said resonant-mode power supply. The resonant-mode power supply comprises also a controller C that stabilizes output voltages or currents by controlling switching frequency of the switches assembly K1, K2, in response to indications of the output voltage and/or current monitoring circuit SMC. The series resonant circuit comprises reactance elements L1, C1 and C2=C2A+C2B whereas the node of connection of capacitances C1 and C2=C2A+C2B is connected through the inductor L4 and diode rectifier DR2 to power supply source and thus constitutes the energy recirculation circuit ERC1. Therefore the resonant circuit quality factor is determined by selecting the ratio of capacitances C1 and C2=C2A+C2B and the inductor L4 inductance value. ERC1 circuit provides the resonant-mode power supply protection against overvoltages and overcurrents because in transient states it allows feeding back the excess energy stored in the resonant circuit to the supply source. The resonant-mode power supply furthermore comprises the current monitoring circuit CMC adapted to monitor the recirculation circuit current Ilim in the resonant circuit energy recirculation circuit ERC1 and, by means of the controller C, to effect a change in the switching frequency of the switches assembly K1, K2 so as to reduce power supplied to the resonant circuit upon exceeding the threshold value by the current Ilim in the energy recirculation circuit ERC1. Preferably the current monitoring circuit CMC operates quickly and responds even during a single cycle of the resonant circuit oscillations. A change in the switches assembly K1, K2 switching frequency may consist in either increasing the switching frequency or in stealing a certain number of cycles of the resonant circuit oscillations, i.e. turning the switches assembly off so as to limit overvoltages and overcurrents occurring in the circuit.

Figure 4:
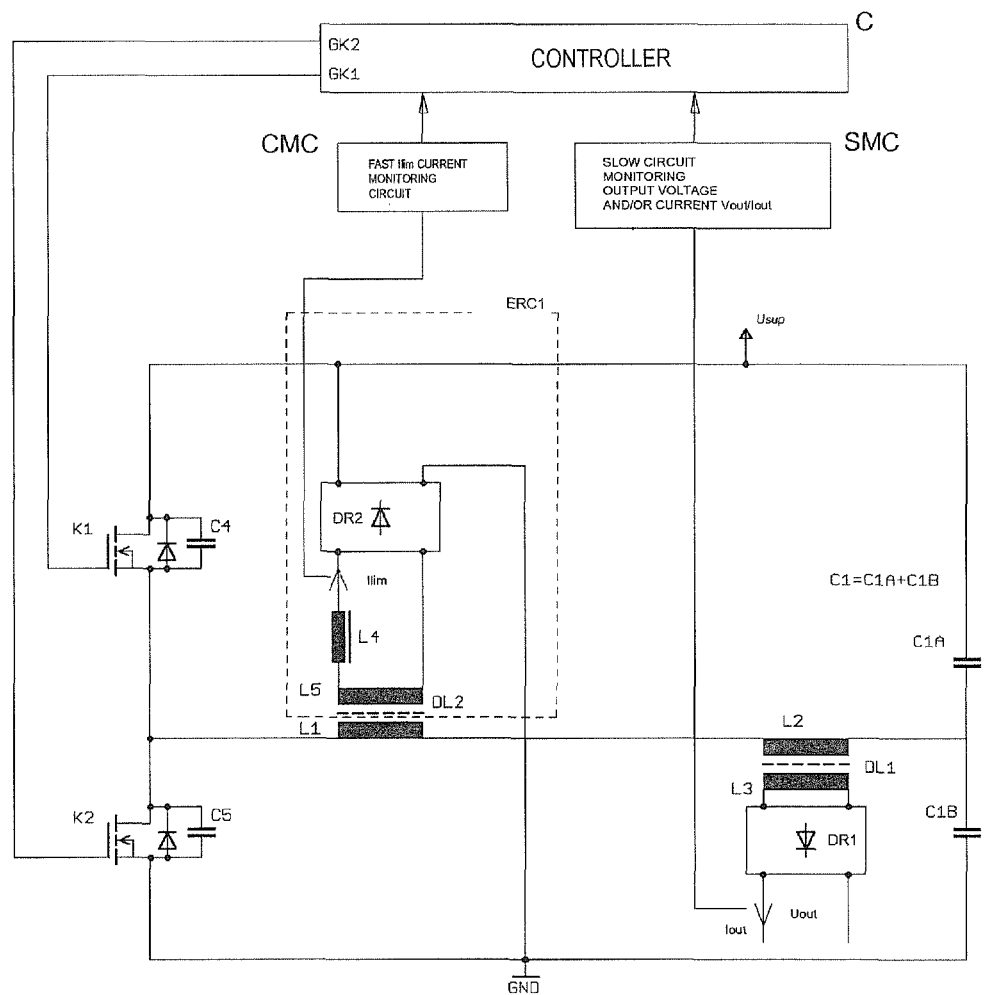
FIG. 4 shows the fourth exemplary embodiment of the resonant-mode power supply as a half-bridge resonant converter with a multi-winding inductor and with a quality-factor limiter incorporating the multi-winding inductor.

The fourth example embodiment of the resonant-mode power supply is shown in FIG. 4. It is similar to the third example embodiment except that the quality-factor limiter ERC1 utilizes the multi-winding inductor DL2 the magnetic circuit whereof contains an air gap, and the secondary winding isolated from the primary feeds back the excess energy from the main resonant circuit to the supply source through inductor L4 and diode rectifier DR2. The advantage of this embodiment over the one shown in FIG. 3 is that it reduces a number of power reactance elements needed for the system construction.

Preferably, inductive elements of the main resonant circuit, i.e. L1, L2 and L3 in the first and third example embodiment, or L1, L2, L3 and L5 in the second and fourth example embodiment, have the form of an integrated inductive element. Therefore, due to appropriate shaping of magnetic fluxes, it is possible to reduce power losses as well as reduce mass and dimensions of the necessary inductive elements.

Stabilization of output currents or voltages for both the full-bridge and half-bridge configuration over a wide range of load changes is achieved by means of a slow-response control of the switches assembly K1, K2, K3, K4 switching frequency and by supplementary fast-response loop CMC which changes the switching frequency even during a single period of the resonant circuit oscillations and whereof control input is the recirculation circuit current Ilim amplitude thereby effectively limiting overvoltages and overcurrents in the resonant circuit. This approach ensures that the recirculation circuit does not transfer large powers and a considerably large current in this circuit occurs solely in transient states and during a disturbance occurrence. Additionally, in order to improve the dynamic response to load changes a supplementary phase control of switches is preferably employed for the full-bridge configuration under light loads whereas a supplementary control with cycle-stealing of the resonant circuit self-oscillations cycles is preferably employed for the half-bridge configuration under light loads.

The invention claimed is:

1. A resonant-mode power supply, comprising an assembly of switches connected in a bridge or a haft-bridge configuration, a series resonant circuit connected in the bridge or half bridge diagonal, a part of which is formed by a multi-winding inductor by means of which a load is connected, and a controller configured to stabilize output voltages or currents by changing a switching frequency of the assembly of switches, wherein the series resonant circuit comprises an energy recirculation circuit comprising an inductor for limiting a resonant circuit quality factor, connected through a diode rectifier to a supply voltage node and in parallel to a resonant capacitance or to a resonant inductance and a current monitoring circuit configured to monitor a current in the energy recirculation circuit and, by means of the controller, to change the switching frequency of the assembly of switches in order to reduce power supplied to the series resonant circuit upon exceeding a threshold value by the current in the energy recirculation circuit.

2. The resonant-mode power supply according to claim 1, wherein the multi-winding inductor leakage inductance constitutes from 20% to 80% of the resonant inductance.

3. The resonant-mode power supply according to claim 1, wherein the current monitoring circuit is configured to effect by means of the controller a change in the switching frequency of the assembly of switches even during a single period of oscillations of the series resonant circuit.

4. The resonant-mode power supply according to claim 1, wherein the current monitoring circuit is configured to effect by means of the controller an increase in the switching frequency of the assembly of switches.

5. The resonant-mode power supply according to claim 1, wherein the current monitoring circuit is configured to turn-off the assembly of switches by means of the controller.

6. The resonant-mode power supply according to claim 1, wherein the energy recirculation circuit is connected in parallel with a resonant circuit capacitor.

7. The resonant-mode power supply according to claim 6, wherein inductive elements of the series resonant circuit have a form of an integrated inductor.

8. The resonant-mode power supply according to claim 1, wherein the energy recirculation circuit is connected to an inductive element of the series resonant circuit by strong magnetic coupling by means of the multi-winding inductor.

9. The resonant-mode power supply according to claim 8, wherein inductive elements of the series resonant circuit have a form of an integrated inductor.

10. The resonant-mode power supply according to claim 1, wherein to each of the assembly of switches there are connected in parallel capacitors.

* * * * *